(12) United States Patent
Dickie

(10) Patent No.: US 7,455,253 B2
(45) Date of Patent: Nov. 25, 2008

(54) PASTRY BLENDER AND COOKED FRUIT AND VEGETABLE MASHER

(75) Inventor: Robert G. Dickie, Newmarket (CA)

(73) Assignee: Kitchen Innovations Inc., King City, Ontario ( * ) Notice: Subject to any disclaimer, the term of this patent is extended or adjusted under 35 U.S.C. 154(b) by 95 days.

(21) Appl. No.: 11/336,074

(22) Filed: Jan. 20, 2006

(65) Prior Publication Data

US 2006/0113413 A1 Jun. 1, 2006

Related U.S. Application Data (63) Continuation-in-part of application No. 10/456,545, filed on Jun. 9, 2003, now Pat. No. 7,007,876, which is a continuation-in-part of application No. 29/178,309, filed on Mar. 26, 2003, now abandoned.

(51) Int. Cl.
*B02C 19/08* (2006.01)
(52) U.S. Cl. .................................. 241/169.2
(58) Field of Classification Search ............ 241/169.2; 30/117, 305; 99/452; 366/129
See application file for complete search history.

(56) References Cited

U.S. PATENT DOCUMENTS

| 920,484 | A | | 5/1909 | Marchand |
|---|---|---|---|---|
| 1,232,356 | A | | 7/1917 | Markee et al. |
| 1,373,843 | A | | 4/1921 | Sundberg |
| 1,374,096 | A | * | 4/1921 | Palmer .................. 241/169.2 |
| 1,447,499 | A | | 3/1923 | Walter |
| 1,645,062 | A | | 10/1927 | Lambert |
| 1,720,361 | A | | 7/1929 | Harris |
| 1,859,958 | A | | 5/1932 | Cessna, Jr. |
| 2,091,754 | A | | 8/1937 | Fedje |
| 2,114,277 | A | * | 4/1938 | Bloomfield .................. 30/117 |
| 2,672,683 | A | * | 3/1954 | Weinberg .................... 30/117 |
| 2,679,688 | A | * | 6/1954 | Buschman .................. 30/117 |
| 3,865,317 | A | | 2/1975 | Brehm |
| D442,823 | S | | 5/2001 | Wright |
| 2002/0181320 | A1 | | 12/2002 | King et al. |

FOREIGN PATENT DOCUMENTS

| GB | 553 409 | 5/1943 |
|---|---|---|
| GB | 555 793 | 9/1943 |

* cited by examiner

*Primary Examiner*—Mark Rosenbaum
(74) *Attorney, Agent, or Firm*—Sand & Sebolt (57) ABSTRACT

A pastry blender or cooked fruit and vegetable masher has a base portion, a side portion and a handle member and is such that the handle is separated from the base portion. The base portion includes an edge frame member that preferably is in the form of a continuous closed loop. The base portion further includes a plurality of cutter wire members which extend between opposed portions of the edge frame member. The cutter wire members preferably have a cross-sectional profile that includes a generally triangularly shaped first region that tapers from a wide portion to an apex; and a second region that preferably is angled or arcuately sloped to encourage foodstuffs to slide off the second region. The cutter wire members are positioned in spaced parallel relation one to another and are rigidly secured to the edge frame member. The spacing between the cutter wire members is at least five times the greatest horizontal width of any one cutter wire member.

19 Claims, 6 Drawing Sheets

PASTRY BLENDER AND COOKED FRUIT AND VEGETABLE MASHER

CROSS-REFERENCE TO RELATED APPLICATIONS

This application is a Continuation-in-Part of U.S. patent application Ser. No. 10/456,545, filed Jun. 9, 2003 now U.S. Pat. No. 7,007,876, which was a Continuation-in-Part of U.S. Design Application No. 29/178,309, filed Mar. 26, 2003, now abandoned, the entire specifications of which are incorporated herein by reference.

BACKGROUND OF THE INVENTION

1. Technical Field

This invention relates to kitchen utensils and particularly relates to devices that may be employed as pastry blenders or as mashers for cooked fruit and vegetables.

2. Background Information

Typically, there have been different tools or kitchen utensils that have been provided in the past for the purposes of a pastry blender, o, as it is sometimes known, a pastry cutter, and as a masher for cooked fruits and vegetables. The general purposes and uses of utensils for differing purposes, as described above, are indeed different, but it has been unexpectedly discovered that by the provision of the novel utensil which comprises, in particular, a substantially planar base portion, the purposes for pastry blending as well as for mashing cooked fruits and vegetables can be satisfied with the provision of a single too, or at least a tool which comprises the principal features of the present invention.

Moreover, it has been unexpectedly discovered that a substantially planar base portion of the utensil of the present invention, especially when used as a pastry blender, gives superior results to even one which has slight curvature of the base portion, as illustrated in the parent application.

As will be discussed hereafter, typically pastry blenders or pastry cutters have a horizontally disposed handle, whereas mashers for cooked fruits and vegetables typically have a vertically disposed handle.

In any event, pastry blenders and cooked fruit and vegetable mashers in keeping with the present invention are particularly characterized by or distinguished by the fact that the structure is rigid, with a substantially planar base portion which has a pair of spaced apart edge frame members with a plurality of cutter wire members extending between them in substantially parallel relation one to another and rigidly secured between the edge frame members.

The principal purposes for which the present invention was developed were as a pastry blender or pastry cutter. However, upon noting the effectiveness with which pastry recipes may be assembled with excellent results, in the manner discussed hereafter, it was noted that cooked fruit and vegetables could be mashed using the same or similar device with excellent results as well.

Dietary habits, particularly in the North American and European public, have varied over the years. It is now much more common to request and expect mashed fruits and vegetables, such as apple sauce, mashed potatoes, turnips or carrots, to be served in a so-called textured manner as opposed to being served in an essentially pureed manner. That is, there may be small lumps or particulate and distinguishable portions of the fruit or vegetable being served along with a much finer fruit or vegetable, where the fruit or vegetable is not said to be lumpy but is acceptable and desired as a textured food.

Typically, when cooked fruits and vegetables are to be mashed, it is a simple matter of a continued vertical cutting action of a masher as it passes down through the food product, with continuous reduction of the size of the particles. Most mashers have wide horizontally disposed blades, and the consequence of their action against the cooked fruit product is to essentially pulverize that food product so as to mash or puree the same. A typical shortcoming of all such vegetable mashers is, however, that the upward motion tends to collect considerable quantities of the fruit or vegetable being mashed, so that it must be discharged from the masher by tapping the tool against the edge of the bowl or saucepan, or otherwise dislodging the food by using the finger or a spoon.

Moreover, in the art of making pastry, considerably more skill and dexterity is required. Many unskilled persons, who attempt to make pastry as pie crust or even tea biscuit batter and the like, tend to overwork the pastry, which results in a tough pastry that neither rises nor is flaky.

The three principal ingredients of pastry are fat such as butter, shortening, lard, or mixtures thereof, together with flour and liquid such as milk or water. It is well known that the best pastry is made using cold ingredients, that is, the shortening, butter or lard should be removed directly from the refrigerator just prior to making the pastry. However, when that occurs, then obviously the fat component is hard and typically must be diced or cubed prior to being worked into the flour, such as by cutting it with a knife. Even that process results in an uneven and tough pastry.

Many pastry blenders have been brought to the market over the years, as described hereafter, but they all suffer from one or more of the following shortcomings: they are ineffective at cutting hard fat, they have insufficient structural strength and rigidity, so that they change their shape; clumped pastry tends to collect on the upper side of the tines or blades of the pastry blender and must continually be dislodged; and an uneven or irregular cutting and blending effect will occur.

A skilled pastry chef will, when blending pastry, press downwardly and at the same time rotate the utensil that he or she is using so as to ensure that the blending effect of the fat components and the flour occurs. The pastry chef does not want the fat component to be broken down into particles that are too small, because the flakiness of the pastry will be adversely affected. At the same time, the pastry chef does not want to overwork the flour so as to unduly stretch the gluten in the flour, resulting in a tough pastry. Thus, several considerations in the design of a pastry blender are that it must be rigid and capable of a torque action placed upon it as it is twisted in the mix of fat and flour—typically, the liquid component is not added at the beginning of the pastry blending process—because especially at the beginning of the process there can be considerable resistance by the hard fat against the pastry blender tool.

Another issue that arises is that with prior art pastry blenders an uneven cutting and blending action occurs. This is a particular consequence of the downwardly curved configuration of most pastry blenders, where a greater cutting force and action occurs at the center of the blender and very little cutting action against the fat occurs at the edges of the pastry blender. Moreover, the very shape of such pastry blenders results in an unwanted build up of fat component on the tines or wires of the pastry blender, which continually have to be dislodged.

The lack of rigidity of most pastry blenders, and their inability to withstand significant forces either downwardly or in torque, also results in uneven cutting and blending actions. Moreover, the shape of the bowl in which pastry is to be blended, or the bowl or saucepan in which a cooked fruit or vegetable is to be mashed, is essentially immaterial. Bowls and saucepans typically have curved sides or they may have straight sides, with a flat bottom or at least a portion of the bottom being flat. Nonetheless, kitchen utensils in keeping with the present invention effectively serve their purpose in any bowl or saucepan.

DESCRIPTION OF THE PRIOR ART

The configuration of a typical pastry blender is shown in U.S. Design Pat. No. D 442,823. While that patent is especially directed at the shape of the handle of the pastry blender, the shape of the wire or tines will be understood from that patent.

Indeed, U.S. Pat. No. 1,645,062, issued Oct. 11, 1927 to Lambert specifically teaches a pastry blender or mixer having a plurality of curved semi-circular cutter wires or mixers.

A somewhat similar device is shown in Fedje, U.S. Pat. No. 2,091,754, issued Aug. 31, 1937.

A mixing device having an essentially flat head is shown in Harris, U.S. Pat. No. 1,720,361, issued Jul. 9, 1929. However, this patent requires that there will be a plurality of mixing or agitating members formed of strips of sheet metal, which must be braced or stiffened with a centrally located bracing bar placed perpendicularly to the sheet metal strips.

Another mixing tool which comprises a plurality of straight wires which, however, are arranged in a circular arc, is shown in Cessna, U.S. Pat. No. 1,859,958, issued May 24, 1932.

A dough mixer having a plurality of broad bars or slots that are stamped out of sheet metal, and then shaped or formed in a semi-circular form so that the blades extend angularly inwardly and downwardly, is shown in Marchand, U.S. Pat. No. 920,484, issued May 24, 1909.

A butter mixer having angled blades that are also stamped from sheet metal is shown in U.S. Pat. No. 1,232,356 issued to Marker et al on Jul. 3, 1917.

SUMMARY OF THE INVENTION

In order to overcome the obvious shortcomings of the prior art, particularly as discussed above, the present invention provides a pastry blender and cooked fruit and vegetable masher which comprises a base portion, a side portion, and a handle member.

The side portion comprises a pair of opposed side support elements which extend vertically away from the base portion and terminate in the handle member at one end thereof, and in an edge frame member at the other end thereof. Thus, the handle member and the base portion are vertically spaced apart from one another.

The base portion includes an edge frame member that preferably is in the form of a continuous closed loop. The base portion further includes a plurality of coplanar cutter wire members which extend between opposed portions of the edge frame member. The cross-sectional profile of the cutter wire members may be round, square, diamond shape, triangular, oblong or combinations thereof. However, the cutter wire members preferably have a cross-sectional profile that includes a generally triangularly shaped first region that tapers from a wide portion to an apex; and a second region that preferably is angled or arcuately sloped to encourage foodstuffs to slide off the second region. The cutter wire members are positioned in spaced parallel relation one to another and are rigidly secured to the edge frame member. The spacing between the cutter wire members is at least five times the greatest horizontal width of any one cutter wire member. The spacing between adjacent pairs of cutter wire members is at least five times more that the greatest horizontal width of any one of the cutter wire members.

In a first embodiment of the present invention, the opposed side support elements each comprise a vertically diverted upper portion and an angularly downwardly directed lower potion which terminates, at its lowest extremity, at one end of a respective one of the spaced apart edge frame members. In this embodiment, the lower portion of each one of the pair of opposed side support elements extends in an opposite direction the other one of the pair of opposed side support elements.

In any embodiment of the present invention, the placement of the cutter wire members may be such that they are secured in a plane below the plane of the edge frame members; alternatively, the cutter wire members may be secured in the same plane as that of the edge frame members.

Typically, the edge frame members are arcuately curved outwardly.

Any embodiment of the blender and masher utensil of the present invention may further comprise a reinforcing bar which is disposed in a plane parallel to the plane of the cutter wire members and disposed closer to the handle member than to the base portion.

In a further embodiment of the invention, the edge frame member comprises a substantially continuous closed loop that may be shaped in the form of a rectangle, square, circle or any variant of the same. The handle member may include four spaced apart side support elements that each include a shoulder region therein. The side support elements terminate in a handle.

When the utensil of the present invention is intended to be utilized as a pastry blender, then typically the handle is disposed in a plane parallel to that of the cutter wire members.

However, particularly if the utensil of the present invention is intended to be used as a masher for cooked fruit and vegetables, the handle may be disposed in a plane vertical to that of the cutter wire members.

It has been found to be effective that the greatest horizontal width of any one of the cutter wire members may be in the range of 0.04 inches to 0.07 inches.

BRIEF DESCRIPTION OF THE DRAWINGS

The novel features which are believed to be characteristic of the present invention, as to its structure, organization, use and method of operation, together with further objective and advantages thereof, will be better understood from the following drawings in which a presently preferred embodiment of the invention will now be illustrated by way of example. It is expressly understood, however, that the drawings are for the purpose of illustration and description only and are not intended as a definition of the limits of the invention. Embodiments of this invention will now be described by way of example in association with the accompanying drawings in which.

DETAILED DESCRIPTION OF THE PREFERRED EMBODIMENTS

The novel features which are believed to be characteristic of the present invention, as to its structure, organization, use and method of operation, together with further objectives and advantages thereof, will be better understood from the following discussion.

A first typical configuration of blender 10, its principal purpose, is shown in FIGS. 1 to 5. Here, blender 10 is shown to comprise a base portion 12, a side portion 14 and a handle member 16.

Figure 1:
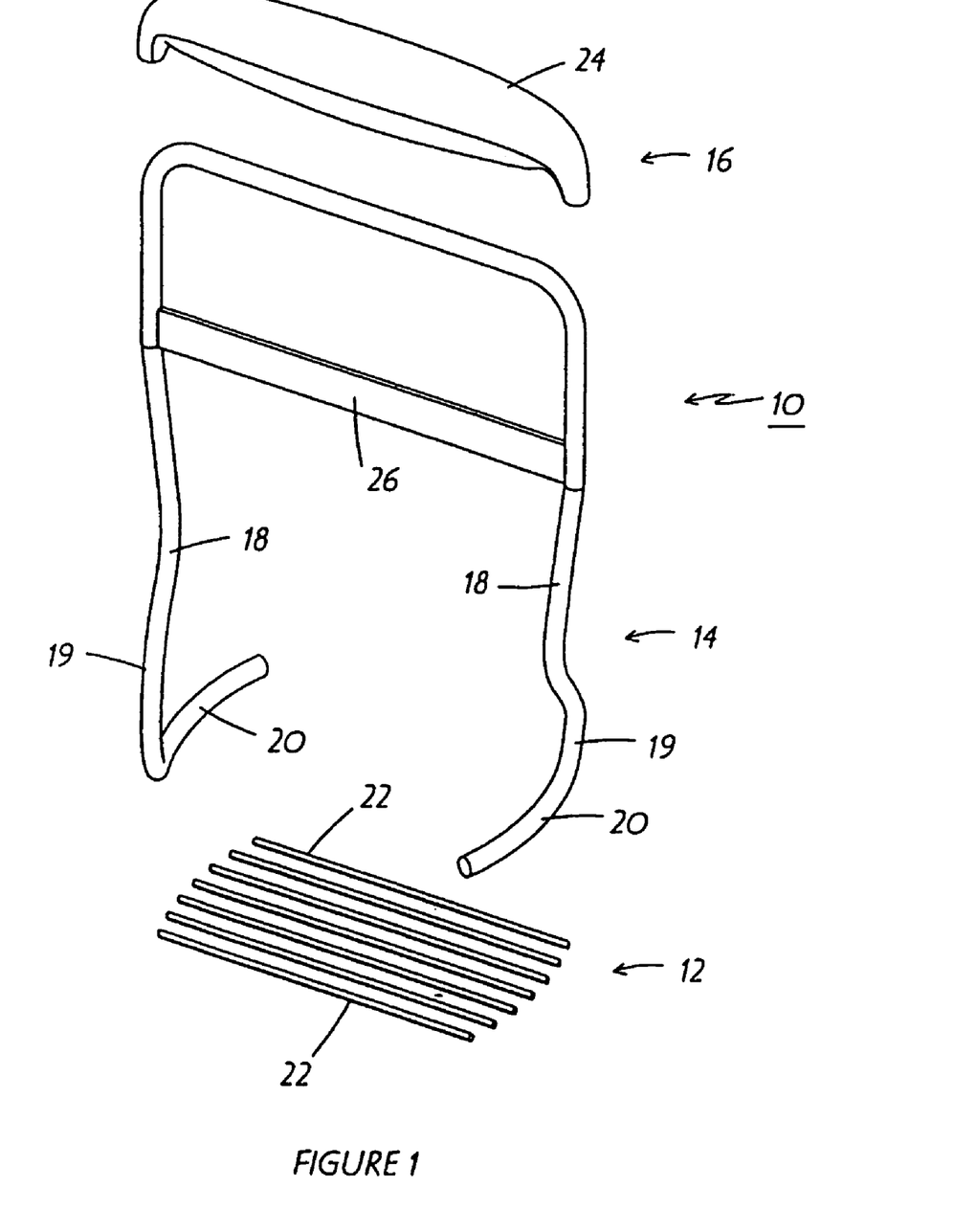
FIG. 1 is a perspective, exploded view of a typical pastry blender or cooked fruit and vegetable masher, showing the principal components thereof in an exploded form.

In the embodiment of FIG. 1, the side portion 14 comprises a pair of opposed side support elements 18 which extend generally vertically away from the base portion 12. It will be seen that the side support elements 18 are terminated at their upper end at the handle member 16, and at their lower end at a pair of spaced apart edge frame members 20. Thus, the handle member 16 and base portion 12 are vertically spaced apart one from the other.

Figure 3:
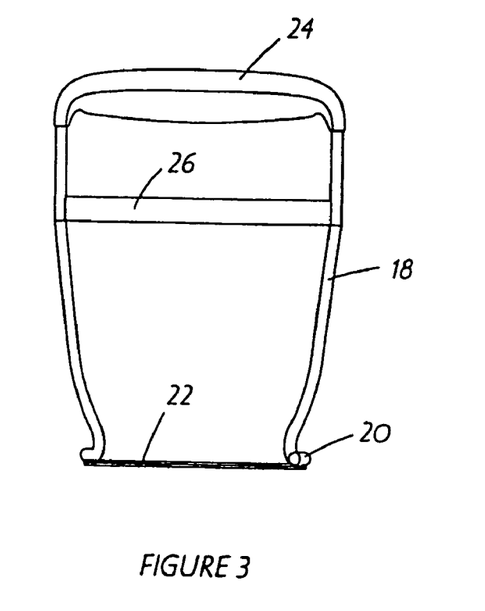
FIG. 3 is an elevation view from the left face thereof of an assembled utensil in keeping with FIG. 1.
Figure 4:
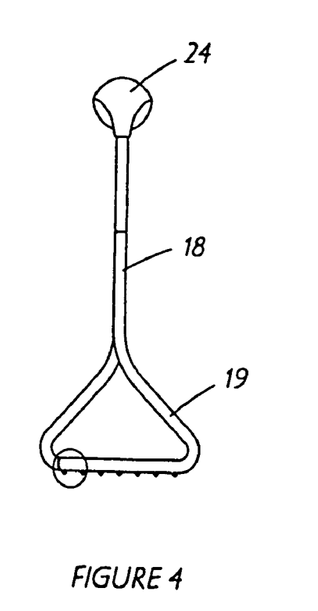
FIG. 4 is an end view of an assembled utensil in keeping with FIG. 1.
Figure 5:
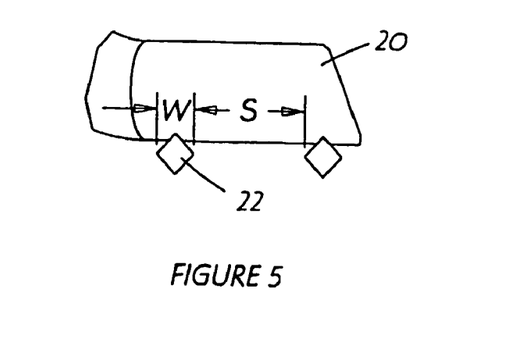
FIG. 5 is an enlarged view of a portion of the base portion as indicated in FIG. 4.

As is evident in each of FIGS. 1 to 5, the base portion 12 comprises a pair of spaced apart edge frame members 20, and a plurality of cutter wire members 22 which extend between the edge frame members 20 in spaced parallel relation one to another. Each of the cutter wire members 22 has a greatest horizontal width w, as seen in FIG. 5, and as can be understood by reference to any of FIGS. 7 to 11, showing various cross-sectional configurations 22a, 22b, 22c, 22d, 22e, respectively, for the cutter wire members 22. In any event, it will be understood that the spacing s between adjacent pairs of cutter wire members 22 is at least five times more than the greatest horizontal width w of any one of the cutter wire members 22.

It is important to note, as well, that the cutter wire members 22 are rigidly secured between the edge frame members 20.

Moreover, it is also important to note that the cutter wire members 22 are substantially coplanar one with another.

In keeping with a particular feature of the present invention, and as a consequence of the manner in which pastry blenders and cooked fruit and vegetable mashers in keeping with the present invention may be manufactured, the rigidity of the cutter wire members 22 as they are secured in place between the edge frame members 20 may be assured by placing the cutter wire members 22 in tension. The manner in which that effect can be achieved is described hereafter.

A particular feature of the embodiment of FIGS. 1 to 5 will now be described. As noted above, there is an unwanted buildup of clumped pastry or other material being blended or mashed with prior art pastry blenders and fruit and vegetable mashers. However, the inventors herein have unexpectedly further discovered that, especially with pastry blenders, that buildup can be substantially alleviated by providing an embodiment such as that shown in FIGS. 1 to 5.

Here, it will be seen that there is a particular configuration to each of the side support elements 18, such that each comprises an angularly downwardly directed lower portion D which subtends a vertically directed upper portion. It will be seen particularly from FIGS. 1, 2 and 3, that each of the lower portions 19 terminates at its lowest extremity at one end of the respective left or right (as seen in FIGS. 1 and 2, for example) one of the spaced-apart edge frame members 20.

However, it will also be noted that each lower portion 19 extends in the opposite direction to the direction that the other one of the lower portion 19 extends. Thus, a rigid frame for the pastry blender 10 is provided, even though it is found only at one or the other of the front or back edges of the base portion 12 at either side thereof.

It has been noted above that typically a skilled pastry chef will import a twisting action to the pastry blender as he or she is making pastry. Moreover, it has been noted that whether or not the pastry chef is right-handed, he or she will tend to import a clockwise twisting action to the pastry blender as it is pushed downwardly into the pastry blend.

Figure 2:
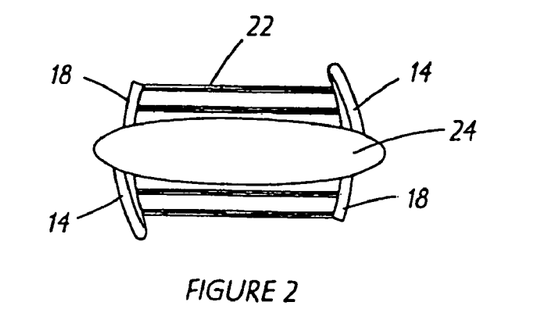
FIG. 2 is a plan view from above, of an assembled embodiment in keeping with FIG. 1.

Accordingly, a typical embodiment of the pastry blender in keeping with the embodiment of FIGS. 1 to 5 will have the rightmost lower portion 19, as seen in FIGS. 1 to 3, sloped rearwardly downwardly, while the leftmost lower portion 19 slopes forwardly and downwardly. This arrangement further tends to alleviated clumping and unwanted excessive buildup of material above the cutter wires 22.

The lower portions 19 may also slope inwardly to some extent, as seen in FIG. 3. This accommodates a wider handle portion 24 to suit larger hand sizes of male pastry chefs.

Figures 6, 7, 8:
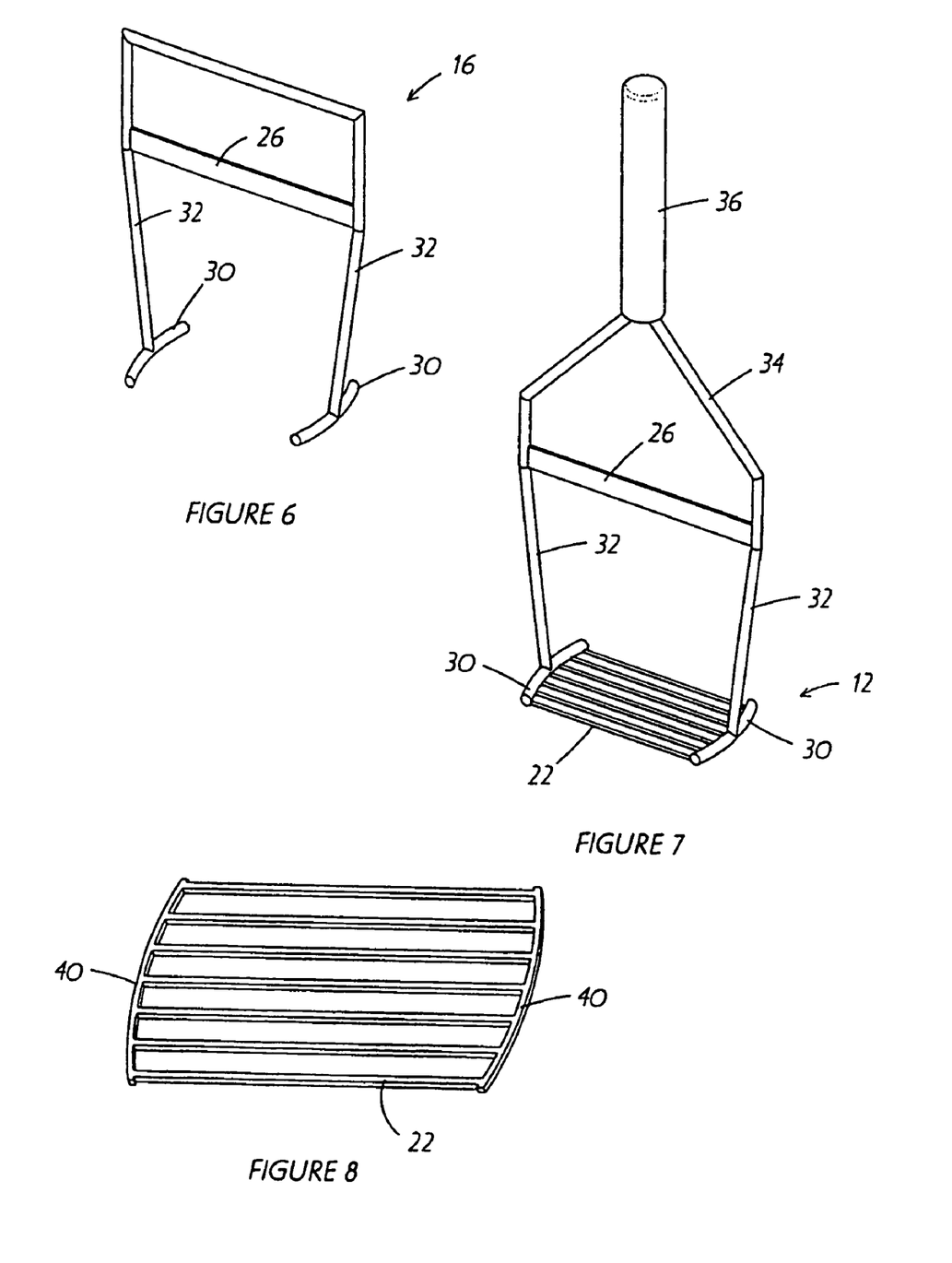
FIG. 6 is a perspective view of a typical assembly of principal structural members in keeping with another embodiment of the present invention, but without the cutter wire members being in place.
FIG. 7 shows a further embodiment similar to that of FIG. 4, of a utensil in keeping with the present invention when configured as a fruit and vegetable masher.
FIG. 8 is a perspective view of the cutter wire members and side frame members of the base portion of a further embodiment of the present invention, when formed integrally one with another.

A further embodiment of the kitchen utensil of the present invention is shown in FIG. 6, and it will be understood that a handle member 24 such as that which is shown in FIG. 1 may easily be attached as well to the frame of the embodiment of FIG. 4. That frame comprises a pair of edge frame members 30 which subtend a pair of opposed side support elements 32. Here, the side support elements 32 intersect the edge frame members 30 in a more conventional, central location of each.

A variation of the embodiment to FIG. 6 is shown in FIG. 7, where the cutter wire members 22 have been secured in place between the edge frame members 30, and wherein the opposed side support members 32 merge into shoulders 34 that terminate in a vertically disposed handle member 36. It will be understood that the embodiment of FIG. 7 is particularly intended to function as a fruit and vegetable masher, since it is more difficult to impart a twisting or torque action against the base position 12 of that embodiment then of the embodiments of FIG. 1 or 6, due the to the disposition of the handle member.

It will also be understood from FIG. 8 that the base portion 12 of any embodiment of pastry blender or cooked fruit and vegetable masher in keeping with the present invention may be integrally formed, such as by molding or stamping. Here, it is seen that the cutter wire members 22 extend between opposed and spaced apart edge frame members 40. In this case, the cutter wire members 22 and the edge frame members 40 are coplanar one with another; whereas in the other embodiments that are illustrated the cutter wire members 22 are coplanar but are disposed in a plane which is below the plane of the respective frame members 20, 30.

Typically, so as to accommodate the round nature of nearly every bowl or saucepan with which the pastry blender or cooked fruit and vegetable masher in keeping with the present invention will be used, the spaced apart edge frame members 20, 30, 40 are arcuately curved outwardly. Such a configuration also assists in mitigating against unwanted buildup of material above the cutter wire members 22.

A reinforcing bar 26 may be disposed in a plane which is parallel to the plane of the cutter wire members 22, and is typically placed closer to the handle member 16 than to the base portion 12.

As noted, typically when a utensil in keeping with the present invention is configured as a pastry blender, it will adopt a configuration such as any of those shown in FIGS. 1 to 6; and when configured as a cooked fruit and vegetable masher, it may adopt a configuration such as that shown in FIG. 7. This is not to say that the details of the construction will be specifically as illustrated, rather, it is to demonstrate that the handle portion 16 may be horizontally or vertically disposed. The reason is that when the handle is horizontally disposed, a turning or torque motion can be easily imparted by the hand of the user to the utensil 10, and then to the pastry being blended; whereas by adopting a configuration such as that shown in FIG. 7, the hand of the user can be spaced higher and further away from a hot fruit or vegetable to be mashed, and so as to avoid contact of the hand and the knuckles thereof with the hot fruit or vegetable being mashed.

Various cross-sectional configurations of the cutter wire members 22 may be employed, as may various sizes of cutter wire members. However, it has not be found to be particularly effective for the cutter wire members 22 to be flat, but they may be square as shown in FIG. 8, particularly when the utensil is to be configured as a fruit and vegetable masher.

It has also been found to be effective that the greatest cross-sectional or horizontal width of any one of the cutter wire members 22 should typically be in the range of from 0.04 inches to 0.07 inches.

Figure 9:
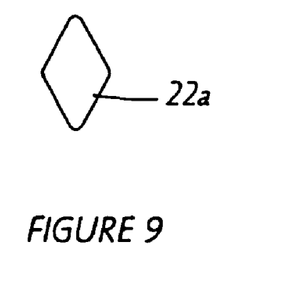
FIGS. 9, 10, 11, 12 and 13 show typical cross-sectional profiles of cutter wire members that may be employed in keeping with the present invention.
Figure 10:
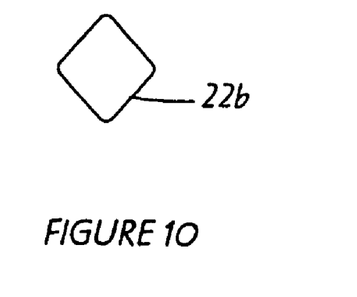
Figure 11:
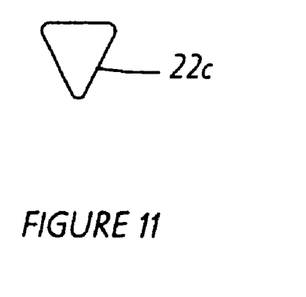
Figure 12:
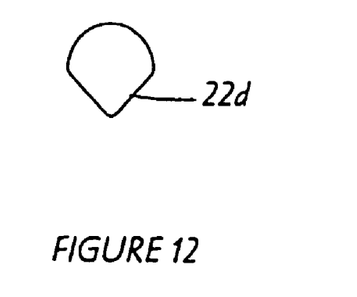
Figure 13:
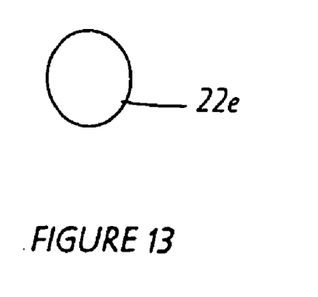

FIGS. 9 to 13 suggest various cross-sectional configurations, such as diamond shapes as shown in FIGS. 9 and 10 at 22a and 22b; triangular or modified triangular shapes as shown in FIGS. 11 and 12 at 22c and 22d; round as shown in FIG. 13 at 22e; or square as understood from FIG. 8.

It is particularly important to note that the cutter wire members 22 must be rigidly secured between respective edge frame members 20, 30, 40. This may typically be achieved by such manufacturing steps as soldering or welding, although such steps are beyond the scope of the present invention. However, it is also noted that the rigidity of the cutter wire members 22, when secured in place between the respective edge frame members 20, 30 40, can be enhanced by placing the cutter wire members 22 in tension.

This can be achieved by one of several techniques. For example, the wire material from which the cutter wire members 22 are to be formed may be heated prior to or as they are being secured to the respective edge frame members 20, 30, 40, so that when they cool down, they attempt to shorten their length and are therefore placed in tension.

Alternatively, the opposed side support elements 18, 32 may be forced inwardly to an extent that does not exceed their modulus of elasticity, and thus their elastic memory, before the cutter wire members 22 are secured in place. Afterwards, the side support elements 18, 32 are released, so as to attempt to regain their initial configuration, thereby causing tension to occur within the cutter wire elements 22.

It will be understood that by having sufficient spacing between adjacent pairs of cutter wire members 22, there is less propensity for the material being blended or mashed to collect above the cutter wire members, and if in any event it is much easier to clear that material away, if necessary, by simply pushing it back through the spaces between the cutter wire members 22 using the fingers or a spoon or spatula.

Yet a further embodiment of the pastry blender and cooked fruit and vegetable masher is illustrated in FIGS. 14-17 and is generally indicated at 50. Pastry blender 50 includes a base portion 52 with a side portion 54 extending outwardly away therefrom. Base portion 52 includes an edge frame member 56 with a plurality of cutter wire members 58 fixedly secured thereto. In this embodiment, edge frame member 56 comprises a substantially continuous closed loop that circumscribes the plurality of cutter wire members 58. Edge frame member 56 includes a back frame member 56a, a front frame member 56b, and side frame members 56c, 56d which preferably are connected together so that forces will be transmitted evenly across base portion 52. Edge frame member 56 defines a central opening 57 between front, back and side frame members 56a, 56b, 56c and 56d.

Figures 14, 15:
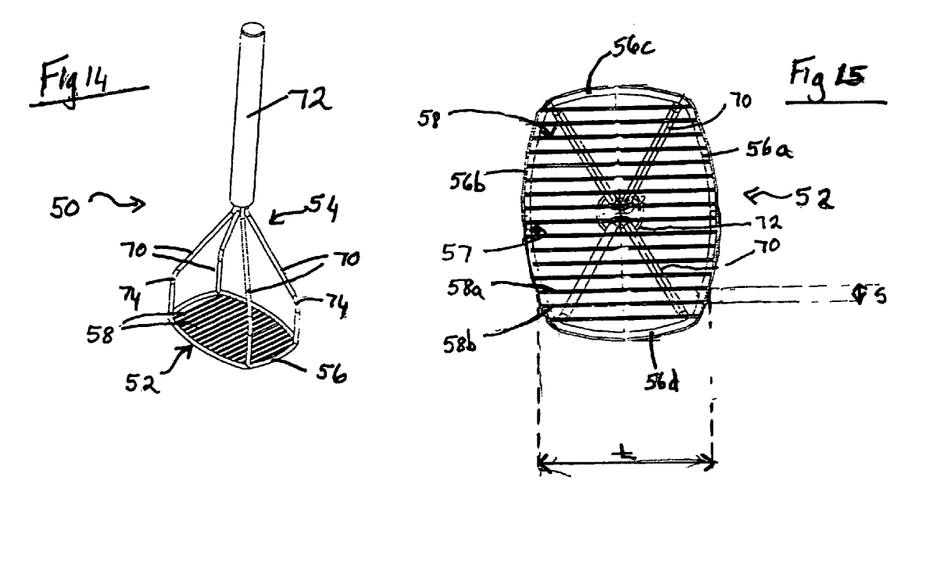
FIG. 14 is a perspective view of a second embodiment of pastry blender and cooked fruit and vegetable masher in accordance with the present invention.
FIG. 15 is a front end view of the pastry blender of FIG. 14 showing the full rim and spacing of the tines of the blender.
Figure 16:
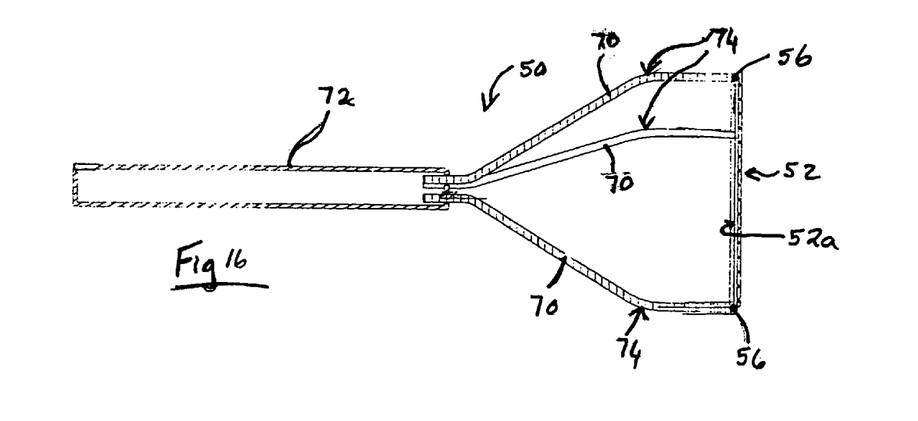
FIG. 16 is a cross-sectional side view of the pastry blender of FIG. 14.
Figure 17:
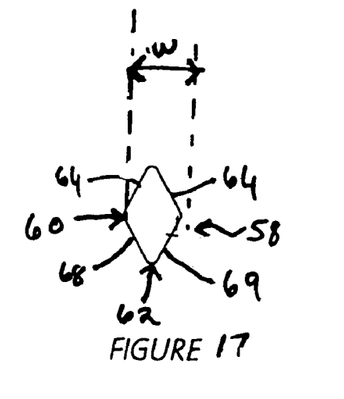
FIGS. 17, 18, 19, 20 and 21 show typical cross-sectional profiles of cutter wire members that may be employed in the second embodiment in keeping with the present invention.
Figure 18:
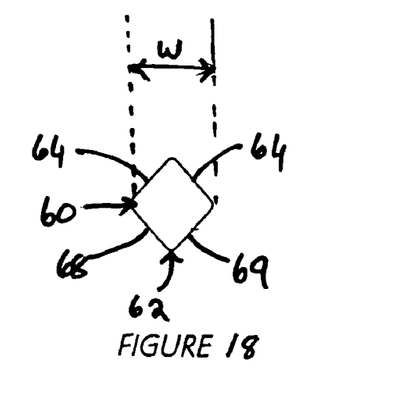

At least four cutter wire members 58 extend across opening 57 and between front and back frame members 56a and 56b. Cutter wire members 58 are disposed in spaced-apart parallel relation one to another and are fixedly secured to front and back frame members 56a, 56b by a suitable method such as by welding. It will be understood, that cutter wire members 58 could alternatively extend across opening 57 and be fixedly secured between side frame members 56c and 56d, without departing from the spirit of the present invention. Edge frame member 56 can be manufactured in any desired shape such as a rectangular, circular, elliptical and square shape or any variant of such shapes such as a substantially rounded rectangular shape with rounded corners as shown in FIG. 15.

The spacing "s" (FIG. 15) between adjacent pairs of cutter wire members 58, such as 58a and 58b, preferably is at least five times more that the greatest horizontal width "w" (FIGS. 17-21) of any one of the cutter wire members 58. Furthermore, the length "L" of each cutter wire member 58 as measured from front frame member 56a to back frame member 56b preferably is at least seven times the spacing "s" between adjacent pairs of cutter wires members, such as 58a and 58b. As with previous embodiments of the invention, the cutter wire members 58 are disposed substantially coplanar one with the other.

Although edge frame member 56 is shown as being integrally formed and co-planar with cutter wire members 58, it will be understood that edge frame member 56 could alternatively be disposed in a plane above or below cutter wire members 58. If edge frame member 56 is disposed in a plane substantially parallel to cutter wire members 58, edge frame member 56 preferably is disposed intermediate cutter wire members 58 and handle 72.

Figure 19:
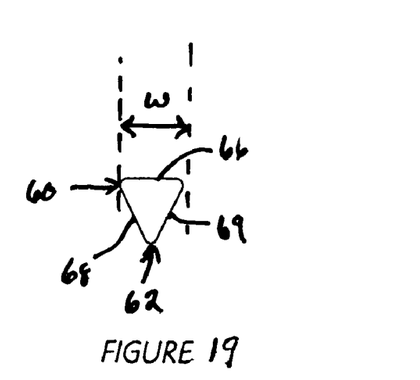
Figure 20:
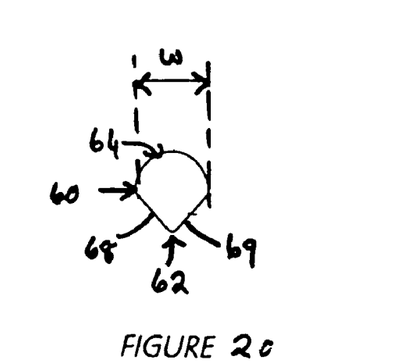
Figure 21:
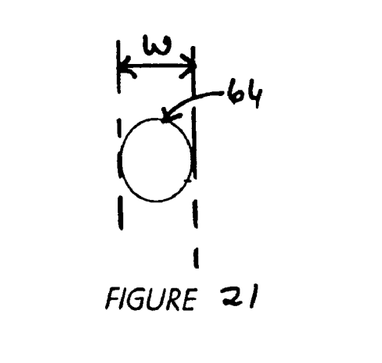

Cutter wire members 58 may be formed with any desirable cross-sectional profile and, preferably, the cross-sectional profile will aid in reducing the tendency of mashed or blended foodstuffs to accumulate on the inner surface 52a (FIG. 16) of the base portion 52. The cross-sectional profiles shown in FIGS. 17-21 are substantially identical to those shown in FIGS. 1-13, but are described in greater detail with reference to the embodiment of blender 50 shown in FIGS. 14-16. Cross-sectional profiles which aid in reducing the tendency of foodstuffs to accumulate on blender 50 are those with angled or sloped upper surfaces 64 (FIGS. 17, 18, 20 and 21) as opposed to substantially horizontal upper surfaces 66 (FIG. 19). These sloped and arcuately angled upper surfaces 64 tend to allow foodstuffs to slide off cutter wire members 58.

Furthermore, cutter wire members 58 having a cross-sectional profile with a substantially triangular lower surface aid the blender 50 in cutting more easily into the pastry or cooked fruit or vegetable. FIGS. 17, 18, 19 and 20 include a wider portion 60 and taper to an apex 62. Furthermore, these cross-sectional profiles that taper from portion 60 of greatest width "w" to narrower apex 62 provide a greater surface area for mashing the pastry or cooked fruit or vegetable. This greater surface area is provided by sides 68, 69 as opposed to width "w".

Each of the plurality of cutter wire members 58 preferably is provided with the same cross-sectional profile where identically profiled members 58 all are oriented in exactly the same manner on base portion 52. So, for instance, all of the cutter wire members 58 may have a cross-sectional profile, such as that shown in FIG. 20, with the apices 62 facing in a direction opposite to the direction in which side support elements 70 extend outwardly away from edge frame member 56. Furthermore, each cutter wire member 58 will preferably include a sloped upper surface 64 disposed opposite the apex 62 so as to encourage foodstuffs to slide off cutter wire members 58.

Side portion 54 of pastry blender 50 preferably includes four side support elements 70 that are connected at a first end to edge frame member 56 and at a second end to a handle 72. Side support elements 70 preferably each include an angled shoulder 74. Side support elements 70 are positioned in such a manner on edge frame member 56 so as to allow for an even distribution of force across base portion 52 when blender 50 is used. It will be understood that while handle 72 is shown to be substantially oriented substantially at right angles to cutter wire members 58, the handle could alternatively be connected to side support elements 70 in such a way that the handle would be disposed substantially parallel to cutter wire members 58.

The advantages of use of the utensil of the present invention, particularly as a pastry blender, are profound. For example, it has been demonstrated that a typical pastry recipe which employs one pound of hard butter, shortening or lard, that has been taken directly from the refrigerator, can be satisfactorily blended so as to make a flaky pastry, when baked, in less than sixty seconds. Tests using the same starting materials and comparing a pastry blender such as those disclosed in the Wright or Lambert patents noted above, with a pastry blender in keeping with the present invention, were made. Using a pastry blender in keeping with the present invention consistently resulted in a satisfactory or excellent pastry being blended in less than sixty seconds. However, only satisfactory, acceptable, or tough pastry resulted after using the prior art pastry blenders for upwards of 15 minutes. As is well known to any pastry chef or pastry afficionado, pastry that is overworked, will be less flaky and it will be tough.

Indeed, it follows that a pastry blender of the present invention provides the best results when used with a hard, cold fat component for the pastry blender because of the excellent fat cutting action that can be obtained. Thus, the wishes for an excellent pastry that is prepared using cold fat and cold liquid components are clearly satisfied; and use of the cold fat components is recommended. This is completely contrary to any prior art pastry blender.

The embodiments illustrated and the other features of pastry blenders and cooked fruit and vegetable blenders, the shape and configuration of pastry blenders and cooked fruit and vegetable masher utensils is in keeping with the present invention. Such utensils may be manufactured using a variety of different techniques, including metal working and stamping, welding and soldering, injection molding, and so on, without departing from the spirit and scope of the present invention.

Other modifications and alterations may be used in the design and manufacture of the apparatus of the present invention without departing from the spirit and scope of the accompanying claims.

Moreover, the word "substantially" when used with an adjective or advert is intended to enhance the scope of the particular characteristic; e.g., substantially planar is intended to mean planar, nearly planar and/or exhibiting characteristics of a planar element.

Throughout this specification and the claims which follow, unless the context requires otherwise, the word "comprise", and variations such as "comprises" or "comprising" will be understood to imply the inclusion of the stated integer or step or group of integers or steps, but not to the exclusion of any other integer or step or group of integers or steps.

The invention claimed is:

1. A pastry blender and cooked fruit and vegetable masher comprising:
   a frame member comprising a substantially continuous closed loop having a central opening therein; and wherein the frame member circumscribes the opening;
   a plurality of parallel, spaced apart cutter wire members connected between opposing portions of said closed loop and across said opening; wherein each of the cutter wire members has a cross-sectional profile that includes two non-parallel planar sides extending downwardly towards an apex;
   a horizontal planar wall extending between the two non-parallel planar sides vertically above the apex; and
   a handle member connected to the frame member and extending outwardly away therefrom.

2. The pastry blender and cooked fruit and vegetable masher as defined in claim 1; wherein the frame member circumscribes the cutter wire members and is coplanar with the cutter wire members.

3. The pastry blender and cooked fruit and vegetable masher as defined in claim 1, wherein the cutter wire members are coplanar one with another and the frame member is disposed between the handle member and the plurality of cutter wire members.

4. The pastry blender and cooked fruit and vegetable masher as defined in claim 1, wherein the frame member is shaped in any one of a rectangular, circular, elliptical and square shape and any variants thereof.

5. The pastry blender and cooked fruit and vegetable masher as defined in claim 1, wherein the frame member has a front edge and back edge and opposing side edges and wherein the cutter wire members extend between the front edge and the back edge.

6. The pastry blender and cooked fruit and vegetable masher as defined in claim 1, wherein the handle member includes a handle and four legs that extend outwardly from the handle and terminate in the frame member.

7. The pastry blender and cooked fruit and vegetable masher as defined in claim 6, wherein the four legs terminate at positions on the frame member which allow for substantially equal force to be applied across all of the cutter wire members when the blender is used.

8. The pastry blender and cooked fruit and vegetable masher as defined in claim 6, wherein the handle is oriented at one of substantially at right angles to the cutter wire members and substantially parallel to the cutter wire members.

9. The pastry blender and cooked fruit and vegetable masher as defined in claim 1, wherein the spacing between adjacent pairs of cutter wire members is at least five times more than the greatest horizontal width of any one of the cutter wire members.

10. The pastry blender and cooked fruit and vegetable masher as defined in claim 1, wherein the length of each cutter wire is at least seven times the spacing between adjacent pairs of cutter wire members.

11. The pastry blender and cooked fruit and vegetable masher as defined in claim 1, wherein the apex of each of the plurality of the cutter wire members faces in the same direction.

12. The pastry blender and cooked fruit and vegetable masher as defined in claim 11, wherein the apex of each of the plurality of the cutter wire members faces in a direction opposite to the direction the handle member extends outwardly away from the frame member.

13. A pastry blender and cooked fruit and vegetable masher comprising:
- a frame member comprising a substantially continuous closed loop having a central opening therein; and wherein the frame member circumscribes the opening;
- a plurality of parallel, spaced apart cutter wire members connected between opposing portions of said closed loop and across said opening; wherein each of the cutter wire members has a cross-sectional profile that includes two non-parallel planar sides wherein the two non-parallel sides are oriented to form a substantially triangular region that tapers from a first wide portion to an apex and wherein the cross-sectional profile of each of the cutter wire members further includes one of an angled and an arcuate portion disposed opposite the apex and
- a handle member connected to the frame member and extending outwardly away therefrom.

14. A pastry blender and cooked fruit and vegetable masher comprising:
- a handle member;
- a base portion connected to the handle member; the base portion comprising:
  - a frame including at least a first edge member and a second edge member disposed a spaced distance one from the other;
  - a plurality of parallel, spaced-apart cutter wire members extending between the first and second edge members; and wherein the cutter-wire members each have a cross-sectional profile that includes a pair of non-parallel planar sides forming a first portion which tapers downwardly to an apex; and said first and second edge members and the cutter members are all of a relatively small height such that a quantity of the fruit or vegetable being processed is not captured therebetween; and
- a horizontal planar wall extending between the two non-parallel planar sides vertically above the apex.

15. A pastry blender and cooked fruit and vegetable masher comprising:
- a handle member;
- a base portion connected to the handle member; the base portion comprising:
  - a frame including at least a first edge member and a second edge member disposed a spaced distance one from the other;
  - a plurality of parallel, spaced-apart cutter wire members extending between the first and second edge members; and wherein the cutter-wire members each have a cross-sectional profile that includes a pair of non-parallel planar sides forming a first portion which tapers to an apex; and
said first and second edge members and the cutter members are all of a relatively small height such that a quantity of the fruit or vegetable being processed is not captured therebetween; and wherein the cross-sectional profile of each of the cutter wire members further includes one of an angled and an arcuate portion disposed opposite the apex.

16. The pastry blender and cooked fruit and vegetable masher as defined in claim 15, wherein the base portion has an inner surface disposed proximate the handle member and an outer surface disposed remote from the handle member; and wherein the apices of the cutter wire members are disposed on the outer surface of the base portion and the one of the angled and arcuate portions of the cutter wire members is disposed on the inner surface of the base portion.

17. The pastry blender and cooked fruit and vegetable masher as defined in claim 16, wherein the handle member includes a handle disposed substantially at right angles to the base portion.

18. The pastry blender and cooked fruit and vegetable masher as defined in claim 16, wherein the handle member includes a handle disposed substantially parallel to the base portion.

19. The pastry blender and cooked fruit and vegetable masher as defined in claim 16, wherein the handle member further includes a pair of side support elements that extend between the handle and the base portion, a first one of said side support elements terminating in an edge frame member that extends in an opposite direction to the other of the side support elements.

* * * * *